US011774738B2

(12) United States Patent
Dennis

(10) Patent No.: US 11,774,738 B2
(45) Date of Patent: Oct. 3, 2023

(54) CONFOCAL RAMAN ANALYSING APPARATUS AND METHOD

(71) Applicant: Andor Technology Limited, Belfast (GB)

(72) Inventor: Andrew Colm Dennis, Greenisland (GB)

(73) Assignee: ANDOR TECHNOLOGY LIMITED, Belfast (GB)

(*) Notice: Subject to any disclaimer, the term of this patent is extended or adjusted under 35 U.S.C. 154(b) by 0 days.

(21) Appl. No.: 17/494,310

(22) Filed: Oct. 5, 2021

(65) Prior Publication Data
US 2022/0107487 A1 Apr. 7, 2022

(30) Foreign Application Priority Data
Oct. 6, 2020 (GB) ...................... 2015815

(51) Int. Cl.
*G01J 3/44* (2006.01)
*G02B 21/00* (2006.01)
*G01N 21/65* (2006.01)

(52) U.S. Cl.
CPC .......... *G02B 21/008* (2013.01); *G01N 21/65* (2013.01); *G02B 21/0032* (2013.01); *G02B 21/0044* (2013.01)

(58) Field of Classification Search
CPC .............. G02B 21/008; G02B 21/0032; G02B 21/0044; G01N 21/65; G01N 21/658;
(Continued)

(56) References Cited

U.S. PATENT DOCUMENTS

| 4,927,254 A | 5/1990 | Kino et al. |
| 2010/0142041 A1* | 6/2010 | Berman ................... G02B 6/06 359/385 |

(Continued)

FOREIGN PATENT DOCUMENTS

| EP | 2685304 A1 | 1/2014 |
| JP | 2014010216 A | 1/2014 |

OTHER PUBLICATIONS

European Search Report pertaining to corresponding European Patent Application No. 21201016, dated Feb. 3, 2022.
(Continued)

*Primary Examiner* — Abdullahi Nur
(74) *Attorney, Agent, or Firm* — GRUMBLES LAW PLLC; Brittany Haanan

(57) ABSTRACT

A Raman analysing apparatus comprises an imaging optical system for imaging an object along an optical path to an optical detector, an irradiation optical system for illuminating the object, and a scanning device comprising a spinning pinhole disk. The irradiation optical system directs light onto the scanning device to illuminate the object at a plurality of illumination points. The imaging optical system images Raman scattered light emitted from the object at the illumination points to an intermediate image plane at which the scanning device is located. The imaging optical system may include a spectral filter and/or at least one optical spectral analyser. The apparatus enables high speed confocal Raman imaging and/or high speed confocal Raman spectography to be performed.

8 Claims, 3 Drawing Sheets

(58) Field of Classification Search
CPC ...... G01J 3/0208; G01J 3/0224; G01J 3/0229; G01J 3/06; G01J 3/44; G01J 3/0205; G01J 3/32; G01J 3/28; G01J 3/26; G01J 3/02
See application file for complete search history.

(56) References Cited

U.S. PATENT DOCUMENTS

| | | |
|---|---|---|
| 2014/0104681 A1 | 4/2014 | Berman |
| 2015/0204789 A1 | 7/2015 | Akkus et al. |
| 2016/0161728 A1* | 6/2016 | Sangu ................ G02B 27/58 359/203.1 |
| 2017/0363848 A1* | 12/2017 | Tsuboi ............... G02B 21/0032 |
| 2019/0187447 A1* | 6/2019 | Hayashi ............. G02B 21/361 |

OTHER PUBLICATIONS

Nakano, Akihiko, "Spnning-disk Confocal Microscopy—A Cutting-Edge Tool for Imaging of Membrane Traffic", Cell Structure and Function, 2002, 27:349-355.

Oreopoulos et al., "Spinning-desk Confocal Microscopy: Present Technology and Future Trends", Methods in Cell Biology, 2014, Chapter 9, vol. 123,153-175.

Search Report pertaining to corresponding Great Britain Patent Application No. 2015815.0, dated Apr. 6, 2021.

\* cited by examiner

CONFOCAL RAMAN ANALYSING APPARATUS AND METHOD

CROSS REFERENCE TO RELATED APPLICATIONS

This application claims priority to Great Britain Patent Application No. 2015815.0, filed on Oct. 6, 2020, the entire disclosure of which is hereby incorporated by reference.

FIELD OF THE INVENTION

This invention relates to Raman analysis, including Raman spectroscopy. The invention relates particularly to confocal Raman analysis.

BACKGROUND TO THE INVENTION

Confocal Raman spectroscopy using a laser and confocal microscope is known. It involves directing the laser light through a single pinhole to illuminate a sample with a single laser point, and collecting the resultant Raman scattered light from the sample via the pinhole. The collected Raman light is sent to a spectrometer which performs single point Raman spectrum acquisition. If a Raman image is required, the sample is conventionally moved with respect to the static laser point using a motorised XY or XYZ stage. Alternatively, the laser may be scanned with respect to the sample. In any event, the image is constructed from the Raman spectra that are obtained individually from a respective sample point, the sample points being illuminated one at a time. The spectrum obtained for each point provides image data representing a single respective pixel of the resulting multi-spectral Raman image. However, conventional point scanning Raman confocal spectroscopy is slow. The sample must be raster scanned and a sufficient dwell time is required at each stage position for light collection. The Raman effect is quite weak when compared to other electromagnetic effects, which further contributes to the slow collection of image data. Accordingly multi-spectral Raman images tend to be relatively small because they are slow to acquire.

Non-confocal Raman spectroscopy using widefield, or global, illumination of the sample is also known. However, widefield Raman spectroscopy typically results in blurred images for two main reasons. Firstly, achieving uniform widefield illumination of the sample is very challenging and so laser brightness can vary across the field of view. Secondly, most Raman samples are very scattering. The majority of incident photons undergo elastic scattering and may ricochet several times before undergoing inelastic scattering to become Raman photon. The Raman photons may ricochet around the sample before being collected and detected. This means there is significant scope for a Raman signal for a certain molecular species to be observed from a location where that species is not present. The result of this is blurred images.

Line scan or line illumination Raman spectroscopy is a hybrid form of Raman spectroscopy whereby a sample is illuminated with a line of light and the Raman scatter is directed towards and focussed through a slit at the focal plane of a spectrometer used to detect the Raman signal. In this form of Raman microscope the slit acts as a confocal aperture in the axis perpendicular to the spectrograph slit, but there is no confocal aperture in the axis of the slit. This form of Raman spectroscopy cannot be considered to be truly confocal.

It would be desirable to mitigate the problems outlined above.

SUMMARY OF THE INVENTION

A first aspect of the invention provides a Raman analysing apparatus, the apparatus comprising:
  an optical detector;
  an imaging optical system configured to image an object along an optical path to the optical detector;
  an irradiation optical system comprising a light source and being configured to illuminate said object by directing light from said light source to the object along at least part of said optical path;
  a scanning device comprising a plurality of apertures, the scanning device intersecting said optical path and being movable with respect to the optical path,
  wherein said irradiation optical system is configured to direct said light onto said scanning device to illuminate said object at a plurality of illumination points,
  and wherein said imaging optical system is configured to image Raman scattered light emitted from said object at said illumination points to an intermediate image plane, said scanning device being located at said intermediate image plane,
  and wherein said imaging optical system includes:
    a spectral filter configured to transmit light only in a selected one or more of a plurality of selectable wavelength ranges; and/or
    at least one optical spectral analyser,
  and/or wherein said imaging optical system is configured to capture at least one Raman image of said object, or of a target area of said object, by detecting Raman scattered light from said illumination points in a selected one or more wavelength range.

Preferably, said scanning device comprises a plurality of lenses aligned with said plurality of apertures to focus said light on said apertures.

Preferably, said scanning device comprises a rotatable scanning disk. Preferably, the scanning device includes a rotatable lens disk in which said plurality of lenses are provided, the lens disk being rotatable with the scanning disk.

Optionally, said irradiation optical system includes a Raman bandpass filter, preferably located between said light source and said scanning device.

Optionally, said imaging optical system includes a filter, preferably located in said optical path between said scanning device and said optical detector, configured to reject light in a wavelength band corresponding to said light from said light source.

Preferably, said light source is a laser light source and is configured to produce a laser beam.

In preferred embodiments, said optical detector comprises an electronic image sensor, for example comprising a CCD or EMCCD detector, or any other suitable digital image sensor, and may optionally be incorporated into, or may comprise, a digital camera. Alternatively, or in addition, said optical detector may comprise an optical spectral analyser, for example comprising a spectrometer or spectrograph.

In preferred embodiments, said spectral filter comprises any one of: an optical filter configured to pass light in one or more fixed wavelength bands, or a tuneable optical filter, for example a liquid crystal tuneable filter (LCTF); an acousto-optic tuneable filter (AOTF); a plurality of different filters on a filter wheel or other movable carriage; a plurality of wavelength/angle tuneable filters on a pivotable filter wheel; a plurality of broad-bandpass filters used in conjunction with a Fabry Perot etalon; or a subtractive double monochromator.

Preferably, said spectral filter, and/or said at least one optical spectral analyser, is located in the optical path between said scanning device and said optical detector, or wherein said at least one optical spectral analyser serves as said optical detector.

In preferred embodiments, the apparatus is configured to capture at least one Raman image of said object, each Raman image comprising, or being created from, said Raman scattered light (or each Raman image is created by detecting said Raman scattered light) in the selected one or more wavelength ranges.

In typical embodiments, the apparatus includes a beam splitter located in the optical path and being transmissive to one of said light source light and said Raman scattered light, and reflective to the other of said light source light and said Raman scattered light, said imaging optical system being configured to image said object along to the optical detector via the beam splitter, and the irradiation optical system being configured to illuminate said object via the beam splitter. Preferably, said beam splitter is transmissive to said light source light and reflective to said scattered Raman light. Preferably, the beam splitter is located between the scanning device and the optical detector. The beam splitter may be located between the scanning disk and the lens disk. The beam splitter is preferably located between the scanning disk and the optical detector, preferably being located adjacent the scanning disk. Optionally, one or more optical polariser is provided in the irradiation optical system, the or each polariser preferably located between the light source and the scanning device. Optionally, one or more polarisation analyser is provided in the imaging optical system, the polarisation analyser preferably being located before the spectral filter or spectral analyser.

In preferred embodiments, said spectral filter is tuneable, or adjustable, to transmit light only in a selected one or more of a plurality of selectable wavelength ranges.

From a second aspect the invention provides a Raman analysing method comprising: illuminating an object with excitation light at a plurality of illumination points simultaneously; and imaging Raman scattered light that emanates from the plurality of illuminated points to an optical detector, wherein said illuminating involves directing the excitation light onto a scanning device to illuminate said object at a plurality of illumination points, and wherein said imaging involves imaging the Raman scattered light to an intermediate image plane, said scanning device being located at said intermediate image plane, said method further including: filtering said Raman scattered light to transmit to said optical detector Raman scattered light only in a selected one or more of a plurality of selectable wavelength ranges; and/or performing optical spectral analysis of the Raman scattered light, and/or wherein said method further includes capturing at least one Raman image of said object, or of a target area of said object, by detecting Raman scattered light from said illumination points in a selected one or more wavelength range.

From another aspect, the invention provides a Raman analysing apparatus comprising:
an optical detector;
an imaging optical system configured to image an object along an optical path to the optical detector;
an irradiation optical system comprising a light source and being configured to illuminate said object by directing light from said light source to the object along at least part of said optical path;
a scanning device comprising a plurality of apertures, the scanning device intersecting said optical path and being movable with respect to the optical path,
wherein said irradiation optical system is configured to direct said light onto said scanning device to illuminate said object at a plurality of illumination points,
and wherein said imaging optical system is configured to capture at least one Raman image of said object, or of a target area of said object, by detecting Raman scattered light from said illumination points in a selected one or more wavelength range.

From a further aspect the invention provides a Raman analysing method comprising: illuminating an object with excitation light at a plurality of illumination points simultaneously; and imaging Raman scattered light that emanates from the plurality of illuminated points to an optical detector, wherein said illuminating involves directing the excitation light onto a scanning device to illuminate said object at a plurality of illumination points, and wherein said imaging involves capturing at least one Raman image of said object, or of a target area of said object, by detecting Raman scattered light from said illumination points in a selected one or more wavelength range.

Preferably, the filtering involves filtering said Raman scattered light to transmit to said optical detector Raman scattered light in a plurality of different selected wavelength ranges, one range at a time, or one group of more than one range at a time.

In some embodiments, the method includes creating a Raman image comprising, or from, Raman scattered light in the selected one or more of the wavelength ranges, preferably including creating a respective Raman image comprising, or from, Raman scattered light in each of the selected wavelength ranges. Advantageously, the method may include creating a composite Raman image comprising, or from, Raman scattered light in each of the selected wavelength ranges. Each Raman image may be created by detecting the respective Raman scattered light.

Preferably, the method includes filtering light emanating from the plurality of illuminated points to remove said excitation light.

Preferably, said illuminating involves scanning a beam of excitation light using a scanning device, and wherein said imaging involves imaging said Raman scattered light to an intermediate image plane, said scanning device being located in said image plane.

Advantageously, said illumination and said imaging are performed confocally.

In preferred embodiments, laser light source and a scanning disk are used to simultaneously illuminate an array of points on a sample, and to collect Raman scattered light from the illuminated points. The scanning disk is rotatable and comprises an array of apertures, commonly referred to as pinholes. As such, the scanning disk may be referred to as a spinning disk, or a spinning pinhole disk. Preferably, a second rotatable disk is coupled to the scanning disk for rotation therewith. The second disk, which may be of a type referred to as a lens, or microlens, disk, comprises an array of lenses, in particular microlenses. The arrangement is such that the lens array and pinhole array are aligned with each other so that light from the laser source is focused on the pinholes by the lenses. Typically, each lens is aligned with a respective pinhole and arranged to focus light on the respective pinhole. The lens disk may be omitted although this results in an inefficient use of the light from the laser source. The disks may be of a type commonly referred to as a Nipkow disk.

In typical embodiments, the scanning disk assembly is part of a spinning disk confocal microscope, and a spectral analyser filter is provided for filtering the collected Raman scattered light. In preferred embodiments, the invention comprises scanning, or Nipkow, disk confocal Raman imaging and enables confocal Raman images to be obtained at relatively high speed, for example an order of magnitude (or more) faster than known spontaneous Raman point scanning based techniques. The problem of blurring is addressed by only illuminating specific points on the sample; photons that ricochet have minimal chance of exiting the sample with a direction and position that would result in transmission back through the Nipkow disk's pinholes. Accordingly, ricocheted photons are rejected by the Nipkow disk confocal arrangement, whereas they would not be rejected by conventional global/widefield Raman spectroscopy.

Preferred embodiments of the invention offer one or more of the following advantages:
  i. High speed confocal Raman imaging and/or high speed confocal Raman spectography. Depending on the sample Raman images may be acquired at a "video" or "real time" frame rate, facilitating the study of surface chemical reactions in real time.
  ii. Low laser illumination intensity per illuminated point. This feature would reduce the potential for sample damage due to overheating, which is an undesirable consequence of having to use an elevated laser power when acquiring Raman spectra from a conventional point scanning confocal Raman instrument. In preferred embodiments, the illumination power per illuminated point is smaller by at least 2 orders of magnitude for the same signal to noise ratio per equivalent time frame.
  iii. Optionally, the scanning disk assembly is retractable out of the optical path to allow the apparatus to operate as a global illumination/widefield Raman microscope.
  iv. The apparatus may include a laser zoom optic to facilitate spinning disk based confocal, traditional point scanning confocal and line scan based operation.
  v. 3D data set collection, e.g. for 3D imaging or topographic imaging is achievable within a practical time period. Conversely, attempting 3D imaging on a point scanning Raman instrument is very slow.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
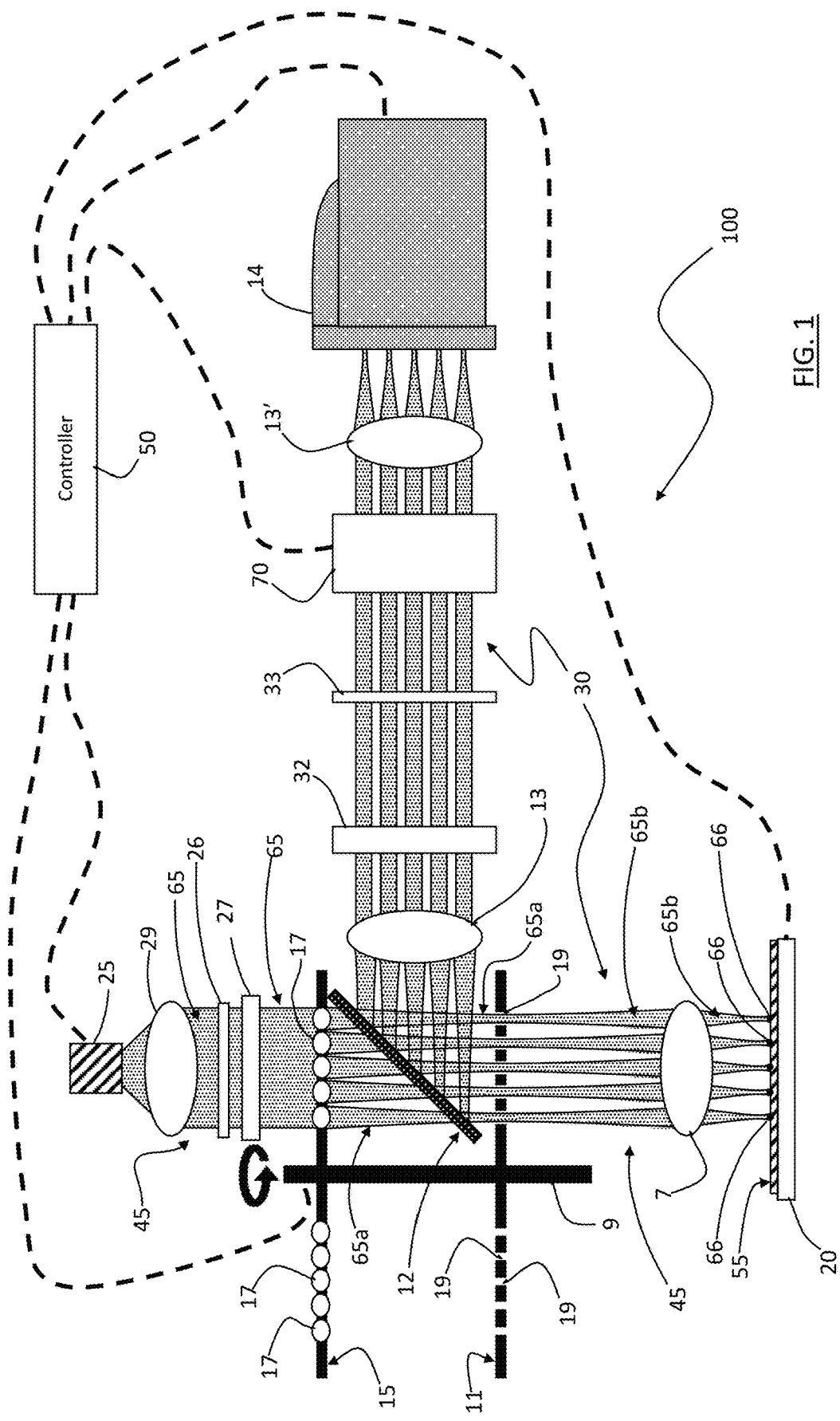
FIG. 1 is a schematic illustration of a spinning disk confocal Raman analysing apparatus embodying one aspect of the present invention.

Referring now to the drawings there is shown, generally indicated as 100, a Raman analysing apparatus embodying one aspect of the invention. The apparatus 100 may comprise an optical microscope, which in preferred embodiments is a spinning disk confocal microscope. As such the apparatus 100 may be referred to as a confocal Raman analysing apparatus. In some embodiments, as described in more detail hereinafter, the apparatus 100 analyses samples by capturing images using Raman scattered light and may be referred to as a Raman imaging apparatus, or a confocal Raman imaging apparatus. In some embodiments, the apparatus 100 may be described as a Raman spectroscopy apparatus, or a confocal Raman spectroscopy apparatus.

The apparatus 100 includes a stage 20 for receiving an object 55 to be analysed. The object 55 comprises a specimen, typically a biological, semiconductor, crystalline or chemical specimen, and may be located in or on a slide or other holder (not shown). The object 55 is located in an object plane.

The apparatus 100 includes an optical detector 14. In preferred embodiments, the optical detector 14 comprises an electronic image sensor (not shown), for example comprising a CCD or EMCCD detector, or any other suitable digital image sensor, e.g. a InGaAs, sCMOS, InSb, Ge or MCD detector depending on the spectral ranges being analysed. The optical detector 14 may be incorporated into, or may comprise, a digital camera or a spectrometer (e.g. comprising a spectrograph and a digital image sensor) or other apparatus comprising a digital image sensor. In other embodiments (not illustrated), the optical detector 14 need not necessarily comprise an image sensor and may alternatively comprise one or more other conventional optical detection device, e.g. one or more single pixel detectors.

The apparatus 100 includes an imaging optical system 30 for imaging the object 55 to the optical detector 14 along an optical path. In preferred embodiments, it is desired that the imaging optical system 30 focuses an image of the object 55 at a focal plane (or image plane) of the optical detector 14. The imaging optical system 30 comprises a train of optical devices, typically comprising at least one lens and optionally at least one mirror, arranged to image the object 55 to the optical detector 14, i.e. form an image of the object 55 at the optical detector 14 via the optical train. The optical train of the imaging optical system 30 includes an objective lens 7, which may be referred to as an objective. The objective 7 has an optical axis that is typically perpendicular with the object plane. Conveniently the objective 7 is a microscope objective, e.g. a compound microscope objective lens, but a plano convex (PCX), achromatic or aspheric lens may be used.

The specific composition and configuration of the optical train may vary from embodiment to embodiment as would be apparent to a skilled person, and only those components that are helpful in understanding the invention are illustrated and described herein.

The optical train of the imaging optical system 30 is configured to form an intermediate image of the object 55 at an intermediate image plane. To this end, the imaging optical system 30 typically comprises a tube lens (not shown), configured to form, together with the objective 7, the intermediate image. A scanning disk 11 is located in the intermediate image plane IIP, intersecting the optical path. The scanning disk 11 is rotatable and comprises an array of apertures, commonly referred to as pinholes. As such, the scanning disk 11 may be referred to as a spinning disk, or a spinning pinhole disk. Preferably, a second rotatable disk is coupled to the scanning disk 11 for rotation therewith. The disks 11, 15 are typically fixed to a common axle 9 and rotate in unison with the shaft. The second disk 15 comprises an array of lenses, or microlenses, and may be referred to as a spinning lens disk or collector disk. The disks 11, 15 together form a spinning disk assembly, and the arrangement of the disks 11, 15 is such that the lens array and pinhole array are aligned with each other so that light incident on the lenses is focused on the pinholes. The lens disk 15 may be omitted although this results in an inefficient use of the light. Either or both of the disks 11, 15 may be of a type commonly referred to as a Nipkow disk.

Figure 2:
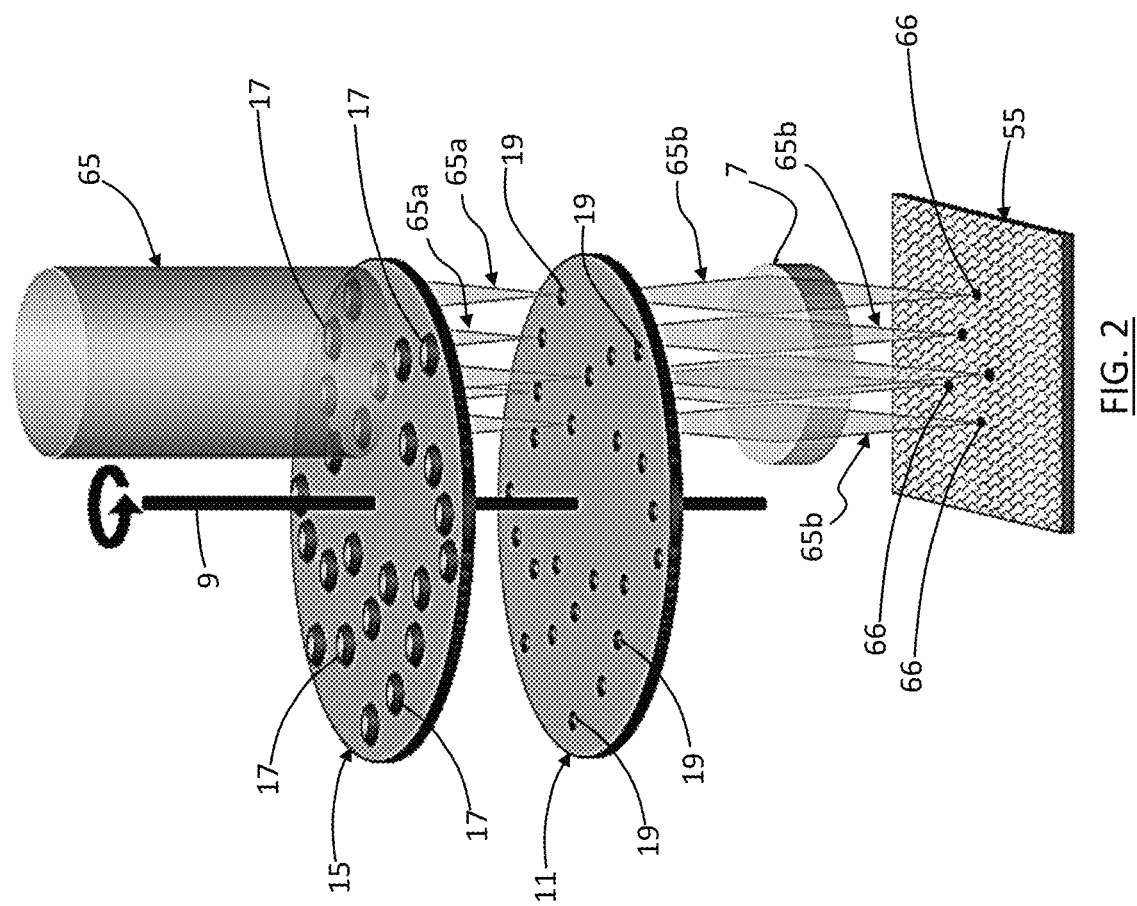
FIG. 2 is a schematic illustration of a scanning disk assembly being part of the apparatus of FIG. 1.

The apparatus 100 may include any suitable drive means (not illustrated) for rotating the disk assembly 11, 15 about its central axis (e.g. via axle 9 in FIG. 2). The drive means typically comprises a motor, usually an electric motor, coupled to an axle of the disk assembly. The disks 11, 15 may spin at any speed that suits the application requirements. For example, in some embodiments the disks 11, 15 may spin at approximately 400 RPM or approximately 20,000 RPM. Typically, the disks 11, 15 spin at any desired speed up to approximately 20,000 RPM.

In alternative embodiments (not illustrated) the scanning disk assembly 11, 15 may be replaced with an alternative scanning device that has a movable plate-like structure with a plurality of apertures, or pinholes, formed in it, preferably coupled to a corresponding, aligned lens structure, and being movable with respect to the optical path in order to point-illuminate the object 55 in the same or similar manner to the disk assembly 11, 15. The scanning device need not necessarily be rotatable, but may alternatively be configured for reciprocating or oscillating movement with respect to the optical path. Any suitable drive means may be provided for this purpose. The pinholes may be arranged in the same or similar manner as described for the disks 11, 15.

The optical train of the imaging optical system 30 typically includes an optical relay comprising at least one relay lens 13, 13' for relaying the object image to the optical detector 14. In the illustrated embodiment, the optical relay, which in this example comprises first and second relay lenses 13, 13,' is located between the spinning disk assembly 11, 15 and the optical detector 14, and is configured to project the intermediate image of the object 55 from the intermediate image plane to the detector 14. More particularly, the imaging optical system 30 is configured to focus an image of the object 55 on an image sensing surface of the detector 14 that is located at the focal plane of the imaging optical system 30. It will be understood that the optical train imaging optical system may include any other suitable arrangement of lenses and, if required, mirror(s) and/or beam splitter(s).

The apparatus 100 includes an irradiation optical system 45 for irradiating the object 55, and in particular the specimen included in the object 55. The irradiation optical system 45 comprises, or is connectable to, a light source 25, which in preferred embodiments comprises one or more laser devices, but may alternatively comprise any other suitable conventional light source, for example one or more LEDs. The light source 25 may be configured to produce light in one or more frequency bands as suits the application and as would be apparent to a skilled person. For example, suitable wavelengths for Raman spectroscopy and imaging are 488 nm, 532 nm 785 nm, but more generally Raman scatter can be detected using light, preferably laser light, in the UV-Visible-Near IR range of wavelengths, for example in the range 200 nm to 1600 nm.

In preferred embodiments, the irradiation optical system 45 is configured to irradiate the object 55 by directing light, typically in the form of a laser beam 65, to the object 55 along at least part of the optical path defined by the imaging optical system 30.

Optionally, one or more optical polariser 26, for example comprising one or more polarising filter and/or other optical polarising component(s), is provided in the irradiation optical system 45 for polarising the irradiation light 65. Polariser 26 polarises light going to the sample 55. The polariser 26 may be provided in any suitable location in the optical irradiation path. Preferably, the polariser 26 is located between the light source 25 and the scanning disk assembly 11, 15. Using polarised light for Raman experiments may be required if, for example, it is desired to obtain information on the symmetry of molecules being studied.

Optionally, a collimating lens 29 is provided between the light source and the disk assembly in order to collimate the beam 65.

Optionally, one or more optical filters, e.g. a bandpass filter, may be provided to condition the beam 65 to suit the application. In preferred embodiments, a bandpass filter 27 is provided, conveniently between the light source 25 and the disk assembly 11, 15, to ensure that only excitation light 65 in a suitably narrow wavelength band is transmitted to the sample 55. For example, the bandpass filter 27 may be configured to have a passband of between 1 nm and 4 nm around the selected wavelength for the excitation light. Filters of the type sometimes referred to as laser-line clean up filters may be used as filter 27. Without the bandpass filter 27, there is a risk that light from at an unwanted wavelength may be incident on the sample which may cause spectral contamination of the resulting scattered light.

In preferred embodiments, the irradiation optical system 45 is configured to irradiate the object 55 through the objective 7. To facilitate this, a beam splitter 12 may be included in the imaging optical system 30. The beam splitter 12 is configured to be transmissive to light in one or more frequency bands corresponding to the light produced by the light source 25, and to be reflective (or at least partly reflective) to light in one or more wavelength band corresponding to light that is emitted from the object 55 when irradiated, in particular Raman scattered light. In this connection, Raman scattered light is typically between approximately $-1000$ $cm^{-1}$ to $+4000$ $cm^{-1}$ relative to the laser wavelength, where negative $cm^{-1}$ denotes Anti-Stokes scattered light. The beam splitter 12 may be said to have one or more reflection band corresponding to light that is emitted from the object 55, and a transmission band corresponding to the light produced by the light source 25. Typically, the beam splitter 12 comprises a dichroic filter, dichroic mirror or other dichroic optical component. The light source 25 is arranged to direct the laser beam 65 through the beam splitter 12 and onto the optical path whereupon it is directed to the object 55 through the objective 7. The beam splitter 12 is located between the scanning pinhole disk 11 and the optical detector 14, typically being located adjacent the scanning pinhole disk 11. In preferred embodiments, the beam splitter 12 is located between the scanning disk 11 and the lens disk 15. The beam splitter 12 is arranged to reflect light that is directed along the optical path from the object and through the scanning disk 11 to the optical detector 14, via the optical relay 13, 13' in the present example. In alternative embodiments (not illustrated) the beam splitter 12 may be reflective to the laser light and transmissive to the Raman scattered light, and the irradiation optical system 45 and imaging system 30 may be configured accordingly (e.g. with respect to FIG. 1, the positions of the optical detector 14 and light source 25 may be swapped).

In preferred embodiments, the apparatus 100 is configured to perform spinning disk confocal microscopy and the light source 25 is arranged to direct the laser beam 65 onto the spinning disk assembly 11, 15, and in particular onto the lens disk 15 (when present). With reference in particular to FIG. 2, the beam 65 from the light source 25 is incident on the lens disk 15 and illuminates a plurality of the lenses 17 (or pinholes if the lens disk is not present) simultaneously. Each illuminated lens 17 focuses a respective light beam 65A on a respective pinhole 19 of the scanning disk 11, each lens 17 typically being aligned with a respective pinhole 19. As such, a plurality of the pinholes are illuminated simultaneously. A respective light beam 65B emerges from each illuminated pinhole 19 and is focused on the object 55 via the objective 7 to illuminate a respect point 66, or spot, on the object 55 simultaneously. Thus, the objective lens 7 relays the image of the exit side of the pinhole disk 11 onto the sample 55, resulting in an array of light (usually laser) spots 66 on the sample 55. The light 65B incident on the object 55 may be referred to as the incident light or excitation light. As the disks 11, 15 rotate, different sets of lenses 17 and pinholes 19 are illuminated causing corresponding sets of points 66 on the object 55 to be illuminated. This, in combination with the pattern in which the lenses 17 and pinholes 19 are arranged, causes the whole object 55 to be point-illuminated, i.e. the entire target area to be analysed. Accordingly, the spinning disk 11, or spinning disk assembly, is configured to act as a scanner, causing the object 55 to be point-illuminated as the disks 11, 15 rotate. It is noted that the object 55 remains static during this illumination, or more particularly there is no relative movement between the objective 7 and the object 55 (or stage 20). The light source 25 is also fixed, or non-scanning.

Typically, the total number of pinholes 19 (and correspondingly lenses 17 in preferred embodiments) is in the order of hundreds or thousands (although it may be higher or lower depending on the embodiment, e.g. in the order of tens, or tens of thousands), and a portion (usually between approximately one twelfth and one twentieth of the total number) of the pinholes 19 may be illuminated at any one time as the disk 11 rotates. For example in preferred embodiments between 400 and 2000 pinholes 19 are simultaneously illuminated. Accordingly, at any given instant multiple (e.g. up to hundreds or thousands) points of the object 55 are illuminated simultaneously. Correspondingly, and as is described in more detail hereinafter, multiple instances (e.g. up to hundreds or thousands) of data may be obtained from the object 55 simultaneously. As such data may be gathered from specimens much more quickly than is possible using conventional single point scanning equipment. Further, the use of the scanning disk 11 allows relatively high powered laser light to be used in comparison with single point scanning equipment.

The light beam 65 is preferably collimated and typically comprises laser light. The light incident on the lens disk 15 does not need to be collimated; non-collimated light may be used, in which case the spacing between the lens disk 15 and pinhole disk 11 may be adjusted to compensate if required and/or the focal length of the lenses 17 may be adjusted accordingly. Light incident the lens disk 15 but not incident on a lens is rejected (usually by a non transmitting coating). Light incident on the pinhole disk 11 but which misses the pinholes 17 is also rejected (usually by a non transmitting coating).

It is noted that the lens disk 15 may be omitted, in which case the beam 65 may impinge directly on the scanning disk 11. However, this results in inefficient use of the light and may adversely affect the signal to noise ratio of resulting images.

In typical embodiments, the lenses 17 and pinholes 19 are arranged in a plurality of spiral arms radiating from a common central point, for example in an Archimedean pattern or Nipkow pattern. The preferred arrangement is such that uniform illumination of the object 55 is achieved. It will be understood that other patterns may be used to creating the scanning illumination described above. In preferred embodiments, the pattern of the lenses 17 matches the pattern of the pinholes, and the lenses 17 and pinholes 19 are aligned with each other in the direction of travel of the light.

Preferably, the pinholes 19 are dimensioned such that the illumination points, or spots, on the object 55 are diffraction limited. Alternatively, the pinholes 19 may be larger than needed to generate a diffraction limited spot, which provides increased optical throughput of both illuminating light and increased throughput of the scattered light but sacrifices spatial resolution/confocality.

The diameter of the pinholes 19 is typically in the range 20 to 100 um. The spacing between pinholes 19 is typically 1000 um but may be higher or lower depending on factors such as the number of pinholes and/or the size of the image that is being passed through the optical system. In comparison with fluorescent microscopy, Raman microscopy involves analysing samples which generate considerably more ricocheting photons (specular or diffuse scattered light) and, as a result, typical embodiments have a wider pinhole spacing than found in a fluorescence microscope. As such, fewer pinholes are illuminated for a given field of illumination/field of view. However, some analysed samples might have very low levels of ricocheting photons and so a pinhole spacing the same or similar to that of a fluorescent microscope may be viable. The lenses 17 may be correspondingly sized and spaced apart.

Optionally, the spinning disk 11, or spinning disk assembly as applicable, is movable, by any suitable conveyancing means (not shown) into or out of the optical path. With the spinning disk 11 (or spinning disk assembly) in the optical path, the apparatus 100 is in a confocal mode in which it may perform spinning disk confocal laser microscopy. When the spinning disk 11 (or spinning disk assembly) is out of the optical path, the apparatus 100 may perform other types of microscopy, including widefield Raman spectroscopy, differential phase contrast microscopy, brightfield microscopy or epifluorescence microscopy.

When the light 65B is incident on object 55 one or more electromagnetic phenomenon may occur (including reflection, transmission, fluorescence, non-Raman light scattering, Raman scattering and others) depending on the nature or composition of the sample/specimen and/or on the characteristics of the incident light 65B. The apparatus 100 is configured to detect Raman scattered light, in particular spontaneous Raman scattered light (also known as normal or far-field Raman scattered light) and enhanced or near-field Raman scattered light.

The apparatus 100 may also detect, if present, Resonance Raman light and/or Surface Enhanced Raman light.

Raman scattered light comprises light scattered by the sample/specimen 55 with a wavelength that is different than the incident light 65B, i.e. incident photons interact with molecule(s) in the sample/specimen 55 resulting in changed energy and therefore changed wavelength. Raman scattering is also known as inelastic scattering and occurs spontaneously in the sample/specimen in response to the incident light. Raman scattered light includes Stokes scattered light, which comprises Raman scattered light in cases where the excitation photon interacts with the molecules in the sample/specimen such that scattered photon has less energy (i.e. has a longer wavelength—Red Shifted) than the excitation photon, and Anti-Stokes scattered light, which comprises Raman scattered light in cases where the excitation photon interacts with the molecules in the sample/specimen such that scattered photon has more energy (i.e. has a shorter wavelength—Blue Shifted) than the excitation photon. The Raman scattered light is emitted by the object 55 and is detected as hereinafter described. Since the Raman scattered light results from interaction with the molecules of the specimen/sample 55 being analysed, its characteristics may be used to provide an indication of the characteristics (e.g. the chemical composition) of the object 55. The temperature of the object 55 may also be determined from the Raman scattered light, and for example can be derived from the ratio of the Stokes and Anti-Stokes signal strengths of a given Raman band.

The non-Raman scattered light comprises elastic scattered light, which is light scattered by the sample/specimen 55 whereby the wavelength does not change, i.e. the incident photon interacts with molecules in the sample but has not changed energy (wavelength).

In response to irradiation of the object 55 by the light 65B, scattered light emits from the object 55 in all directions and a portion of this light passes through the objective lens 7. It is noted that the object 55 remains static during this collection of light, or more particularly there is no relative movement between the objective 7 and the object 55 (or stage 20). The light source 25 is also fixed, or non-scanning. The imaging optical system 30 relays this portion of the scattered light to the intermediate image plane in which the scanning disk 11 is located. The configuration of the imaging optical system 30 is such that only light than emanates from currently illuminated points 66 of the object 55 is focused on the intermediate image plane, and as such passes through the pinholes 19. In particular, the arrangement is such that light emanating from each illuminated point 66 on the object passes through the respective pinhole 19 through which it is illuminated. Light not emanating from the illuminated spots 66, e.g. light from secondary (or multiple) reflections, is focussed above or below the intermediate image plane, or is incident on the pinhole disk 11 but not on a pinhole, and so is rejected by the scanning disk 11, typically by a non-transparent coating on the disk 11.

Accordingly, light is collected confocally. It is noted that the pinhole size dictates the size of the laser spots 66 on the sample 55 and therefore dictates the spatial resolution of the collected Raman image. The pixels of the image sensor of the optical detector 14 should be appropriately selected to ensure the detector 14 does not under-sample the image and result in a loss of image clarity (resolution). In some embodiments, it may be beneficial to use relatively large pinholes that are not optimised to generate or collect light from a diffraction limited spot (as would be typical when performing confocal microscopy). This arrangement facilitates the collection of some reflected/ricocheted photons (reflected in the direct vicinity of the illuminated spot 66) such that more Raman photons are measured. This approach would give a superior signal intensity at the determent of image resolution.

The scattered light that passes through the pinholes 19 comprises scattered photons including elastically scattered photons (of the same wavelength as the laser light 65) and inelastically scattered Raman photons (which have different wavelengths to that of the excitation light 65). The scattered light passing through the scanning disk 11 is incident on the beam splitter 12 which is configured such that only the Raman scattered light reaches the optical detector 14. In the illustrated embodiment, the beam splitter 12 is configured to allow the elastically scattered light to pass through it and travel back towards the light source 25 (or otherwise away from the detector 14), but reflect or otherwise direct the Raman scattered light to the detector 14, via the optical relay 13, 13' in this example.

The beam splitter 12 may be configured to act as a filter, e.g. a short pass, long pass, band pass or notch filter as required, to control which wavelength(s) of light are allowed to reach the detector 14. For example, to facilitate the collection of Stokes Raman scattered light, the beam splitter 12 may be configured as a short pass filter which transmits all light on the shorter, or blue, side of a specified wavelength, and reflects the Stokes scattered photons (which are red shifted and have a longer wavelength) towards the optical detector 14. Alternatively, the beam splitter 12 may be configured to act as a notch filter that transmits light in at the wavelength of the excitation light 65 and reflects other light, including Stokes (red) shifted and anti-Stokes (blue) shifted light. Alternatively, the beam splitter 12 may be configured to act as a long pass filter that only reflects the Anti-stokes spontaneous Raman emissions. It will be understood that in alternative embodiments in which the imaging system 30, and in particular the beam splitter 12, is configured the transmitted light that reaches the optical detector 14 and the reflected light that is directed away from the optical detector 14, the beam splitter 12 may be configured in a manner that is the opposite to the configurations described above.

Optionally, the beam splitter 12 is removable and may be replaced by an alternative beam splitter with different transmission/reflection characteristics to suit different applications. Optionally, the apparatus 100 comprises a plurality of beam splitters 12, each having different transmission/reflection characteristics, provided on a conveying device (not shown) that is operable to locate any one of the beam splitters 12 in the optical path at a time. The conveying device may take any suitable form, for example comprising a wheel or linear conveyor, and may be manually moveable or power operated (e.g. by an electric motor) to move a selected one of the beam splitters 12 into the optical path. Supporting the use of different beam splitters 12 is advantageous not only in that it facilitates analysis of different types of emissions from the object 55 (e.g. switching between collection of Stokes scatter, or anti-Stokes scatter, or a simultaneous Stokes/anti-Stokes scatter), but also in that it facilitates the use of different light sources 25, i.e. producing light 65 with different wavelengths, which may be desirable as certain lasers are more sensitive when analysing certain types of samples.

Optionally, the imaging optical system 30 may include one or more optical filter 32 in the optical path, the filter(s) 32 being configured to remove, from the light returning from the object 55, light with wavelength(s) that are not desired for the analysis being performed. In the illustrated embodiment, optical filter 32 is located between the beam splitter 12 and the optical detector 14, conveniently between the relay lenses 13, 13'. The filter(s) 32 may be located elsewhere in the optical path on the detector side of the beam splitter 12. By way of example, some elastically scattered photons may be reflected by the beam splitter 12, and the filter 32 may be configured to reject this elastically scattered laser light to prevent it from reaching the optical detector 14. The filter 32, which is typically a notch or edge filter, is preferably configure to reject light in the wavelength band corresponding to the light beam 65 produced by the light source 25.

Optionally, one or more polarisation analyser 33, for example comprising one or more polarising filter and/or other optical polarising component(s), is provided in the imaging optical system 30. The polarisation analyser 33 may be provided in any suitable location in the optical imaging path. Preferably, the polarisation analyser 33 is located before the spectral analyser 70, conveniently between the beam splitter 12 and the spectral analyser 70. The relative orientation of polariser 26 and polarisation analyser 33 affects the spectral pattern observed at the output. For example, when polarisation analyser 33 is orientated parallel to polariser 26 there a specific spectral pattern, whereas if the two optical components 26, 33 are oriented such that polarisations are crossed, i.e. are non-parallel, then a different spectral pattern is observed. The different peak intensities observed in these two polarisations may correspond to the symmetry of a molecular bond.

The reflected Raman light collected by the imaging optical system 30 contains a vast number of photons at a multitude of different wavelengths, and which have emanated simultaneously from different locations of the object 55 from a broad range of positions across the illuminated area of the sample as determined by the locations of the illuminated spots 66.

In a conventional Raman microscope which illuminates single spots of the sample at a time, a single beam of Raman light is directed into a spectrometer (usually via free space or fibre optically coupled) where spectral analysis of a broad range of wavelengths can be simultaneously performed. This approach works well for a single point illumination/scanning and for line scanning. However, this approach does not allow distinction between photons that have emanated simultaneously from multiple locations on the sample, and so this conventional approach is not well suited for use with preferred embodiments of the invention.

As described above, the imaging optical system 30 focuses an image at the focal plane of the optical detector 14. The image consists of Raman photons since any other photons that were collected simultaneously from the object 55 are removed or rejected by the image optical system 30, in particular the beam splitter 12 and/or filter(s) 32 before reaching the optical detector 14. It is noted that a relatively low level of residual laser/Rayleigh photons may not be rejected or removed by the image optical system 30 and may still be present. Nevertheless, the image predominantly or substantially consists of Raman photons. Moreover, the image (which may be referred to as a Raman image) formed at the focal plane consists of Raman photons collected simultaneously from different locations on the object 55 in accordance with the points 66 that are simultaneously, or substantially simultaneously, illuminated. In particular, upon rotation of the scanning disk 11 to point-illuminate the entire object 55 (i.e. the entire target area to be analysed), the Raman image consists of Raman scattered light collected substantially simultaneously from all of the illumination points 66 across the entire object 55, i.e. in the time taken for the scanning disk 11 to point-illuminate the entire object 55.

In preferred embodiments, a spectral analyser filter 70 is provided in the optical path before the optical detector 14. The spectral analyser filter 70 may be located at the optical input of the optical detector 14. In the illustrated embodiment the spectral analyser filter 70 is located between beam splitter 12 and the optical detector 14, preferably between the filter 32 and the optical detector 14. Conveniently, the spectral analyser filter 70 is located between the relay lenses 13, 13'. However, the spectral analyser filter 70 may be located at any other suitable location in the optical path. In alternative embodiments (not illustrated), in place of, or in addition to, the spectral analyser filter 70, the imaging optical system may comprise one or more other optical spectral analyser, for example an optical spectrograph or an optical spectrometer, for spectrally analysing, or spectroscopically analysing, the Raman light provided by via the imaging optical system 30. It is noted that, in such embodiments, the apparatus 100 may not necessarily capture Raman images and so the optical detector 14 need not comprise an image sensor. For example, in embodiments in which an optical spectral analyser, e.g. comprising an optical spectrograph or an optical spectrometer, is provided in the imaging optical system, the optical spectral analyser may itself be the optical detector, and a separate optical detector, such as an image sensor, pixel sensor or camera, need not be provided (but may still be provided depending on the requirements of the application). Alternatively, or in addition, the imaging optical system 30 is configured to capture at least one Raman image of the object, or of a target area of the object, by detecting Raman scattered light from the illumination points in a selected one or more wavelength range.

Figure 3:
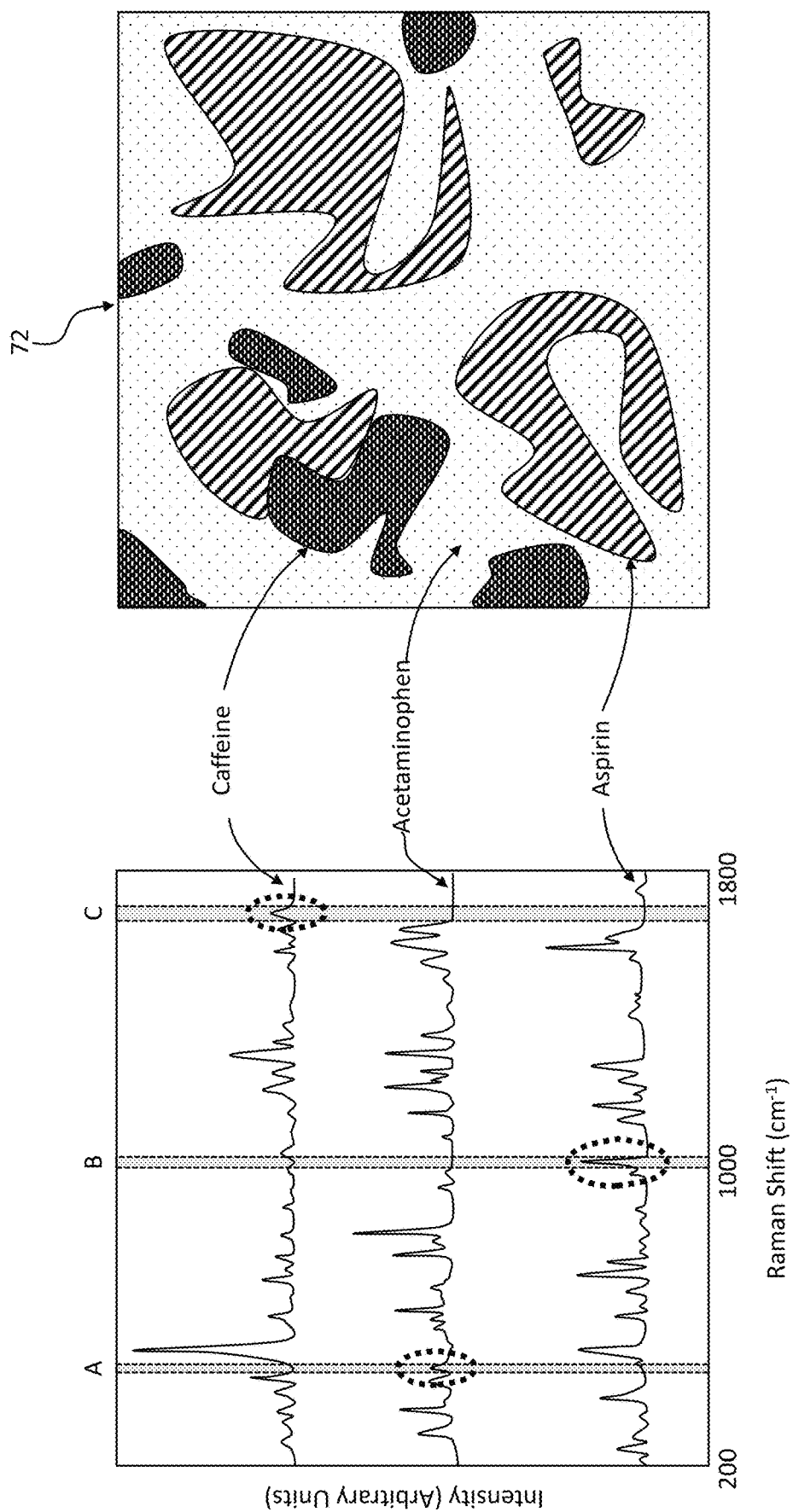
FIG. 3 shows a representation of a Raman image obtained from a sample and the corresponding Raman spectra.

The preferred spectral analyser filter 70 is adjustable, or tuneable, so that it transmits light only in a selected one or more of a plurality of selectable wavelength ranges. The spectral analyser filter 70 may comprise any suitable adjustable spectral filter device. For example, the spectral analyser filter 70 may comprise any one of the following devices: a liquid crystal tuneable filter (LCTF); an acousto-optic tuneable filter (AOTF); a plurality of different filters on a filter wheel or other movable carriage; a plurality of wavelength/angle tuneable filters on a pivotable filter wheel; a plurality of broad-bandpass filters used in conjunction with a Fabry Perot etalon; or a subtractive double monochromator (for example a first spectrograph may be configured to disperse the light and then refocus the light into a intermediate focal plane between the first spectrograph and a second spectrograph where a physical block is provided to allow only a specific wavelength range to pass; the second spectrograph is configured to un-disperse the light and a monochromatic or filtered image is placed at the output of the second spectrograph). In the example of FIG. 3, there is one peak for each of the ingredients of the sample 55, and the peaks are non-overlapping. Alternatively, the sample 55 may comprise one or more substances associated with more than one non-overlapping peak. From a signal to noise perspective is would be desirable to collect light from as many of such non-overlapping peaks as possible since this would collect more photons and therefore produce data with lower noise than if a single non overlapping peak was used. Some known tuneable filters (or fixed filters) can be configured to pass a number of discrete bands.

In alternative embodiments, the spectral analyser filter 70 need not be adjustable, or tuneable, but may instead be configured to pass light in a fixed wavelength band, or preferable a plurality of different, preferably discrete or non-overlapping, fixed wavelength bands. The fixed wavelength band(s) may be selected for analysing a sample 55 comprising specific substance(s) of interest, e.g. wherein the wavelength band(s) correspond to specific wavelength(s) of Raman light that emanate from the sample 55 during use. A plurality of such fixed filters may be provided, each with different pass band characteristics, and may be installed and removed as required depending on the composition of the sample being analysed.

As described above, the imaging optical system 30 is configured such that Raman light from the entire illuminated region of the sample 55 is optically relayed through the spectral analyser filter 70. Depending on the setting of the spectral analyser filter 70, all wavelengths except those in the, or each, selected wavelength range are rejected by the filter 70, and Raman light in the single selected wavelength band, or multiple selected wavelength bands, is allowed to pass to the optical detector 14. As a result, a Raman image of the entire object 55 is focused on the focal plane of the optical detector 14 consisting of only Raman light in the selected wavelength range or ranges. The spectral analyser filter 70 may subsequently be adjusted to allow Raman light from one or more different wavelength range to pass, thereby causing a Raman image of the entire object 55 to be focused on the focal plane of the optical detector 14 consisting of only Raman light in the different selected wavelength range or ranges. This process may be performed for as many or as few wavelength ranges as desired, depending on the application. Hence, in preferred embodiments, the filter 70 is tuneable to allow light in any one of a plurality of different wavelength bands to pass through it simultaneously. Accordingly, if a target substance in the sample 55 is associated with Raman scattered light in multiple wavelength bands, then the filter 70 may be tuned to allow light in each of those bands to pass through it simultaneously. Alternatively, the filter 70 may be adjusted so that the light in each band passes through it in sequence, one band at a time.

Capturing Raman images in this way is useful for analysing the composition of the sample/specimen 55, particularly when an expected composition is known, e.g. for the purpose of process control or quality control. This is because the presence of Raman light within a given wavelength range, or ranges, can be associated with the presence in the sample 55 of a corresponding chemical substance. Therefore the presence of one or more chemical substances in the sample 55 can be detected by setting the spectral analyser filter 70 to pass Raman light in the respective wavelength range or ranges. Moreover, since Raman images are produced, the spatial distribution of the respective chemical substance in the sample 55 is detected.

For example, FIG. 3 shows three Raman spectra for three different chemical substances, namely aspirin, acetaminophen and caffeine in this example. It will be seen that each spectrum has a peak at a respective different wavelength, A, B and C respectively, at which the other spectra do not have a peak. Therefore, by tuning the spectral analyser filter 70 to pass wavelengths in a band at wavelength A (e.g. setting it to operate as a notch filter centred around wavelength A), the resulting Raman image 72 shows the spatial distribution of the relevant chemical substance (Aspirin in this example). Similarly, the other chemical substances may be detected by tuning the spectral analyser filter 70 to a wavelength band corresponding to wavelengths B and C, and the resulting Raman images 72 shows the spatial distribution of the other relevant chemical substances, acetaminophen and caffeine respectively in this example. This process can be performed for as few or as many chemical substances as desired. The individual Raman images may be combined to form a composite Raman image as shown in FIG. 3, which provides a spatial indication of the chemical composition of the sample 55 in respect of the targeted chemical substances. Is it noted that wavelength band(s) may be selected to facilitate collection of data relating to one or more substance in the sample 55. For example, the position of a peak, or the intensity, in a sample of some crystalline materials can determine parameters such as stress or pressure. Temperature can also be determined using this technique.

It is noted that the apparatus 100 does not detect the whole Raman spectra, but instead captures a respective Raman image corresponding to the, or each, selected wavelength band. Advantageously, each wavelength band is selected to correspond with wavelengths at which there is a peak in the Raman spectrum of a given target substance or species, and preferably also at which there is no peak in the respective Raman spectra of one or more other substance or species that may be present in the sample 55. In this context, a peak may be defined as the presence of Raman scattered light above a suitable threshold level. The threshold level may be set depending on the application, and may be determined empirically, or by calculation and/or by any suitable calibration process.

Capturing Raman images in the manner described above is very rapid in comparison with conventional methods of constructing Raman images, but it does not collect all Raman spectral information. The entire Raman spectra for every illuminated point on the sample 55 is incident on the spectral analyser filter 70 but only Raman light in one or more selected wavelength range is permitted to reach the optical detector 14 at any one time. By taking a plurality of Raman images at corresponding different wavelength ranges, a hypercube of images and a spectrum can be extracted from every pixel. A respective Raman image may be captured at every wavelength supported by the apparatus 100 in order to provide all spectral information at all data points. For large images, this process would remain much faster than traditional point scanning. More generally, the higher the number of wavelength bands at which Raman images are captured the more spectral information is acquired. Depending on the application, the number of wavelength bands at which Raman images are captured may be selected to give adequate spectral information to ensure there are no incorrectly identified samples, while being executable fast enough to take the images in a timescale that would be practical (and still considerably faster than traditional point scanning). This approach is suitable for chemometrically or univariately separating spectral contributions from mixtures which do not contain isolated spectral features.

Using the example of FIG. 3, as described above a user may just take three images, one for each substance present in the sample 55, in order to determine the distribution of the substances in the sample. However, if it is desired to obtain all of the Raman spectral information, a large number of images may be captured at multiple different wavelengths resulting in intensity information each wavelength. By arranging the captured information sequentially according to wavelength, a complete (or partial) spectrum may be constructed from every pixel in the image. The resulting data set contains the XY pixel information (optionally also Z data) and a spectrum or partial spectrum. This type of dataset may be referred to as a Hypercube of data or a Hyperspectral image datacube. This technique involves collecting a complete image comprising all XY data a single wavelength, and the missing spectral data may be collected by scanning the spectral analyser. The approach described above results in the same end dataset as would be acquired by a traditional point scanner. The traditional Raman instrument collects all spectral data (at a pre-defined resolution dictated by the pixel camera on the spectrometer) and then the XY (and optionally Z) data is sequentially collected by moving the sample.

The apparatus 100 typically includes a control system comprising one or more controller 50 configured to control the operation of the apparatus 100 as described herein.

Typically the controller 50 is configured to control the operation of the optical detector 14, the stage 20 and spectral analyser filter 70. In typical embodiments, the controller 50 moves the stage 20, and therefore the sample 55, in order to acquire a 3D image of the sample. In embodiments where only 2D images are required, the stage 20 does not need to move and so does not need to be controlled by the controller 50. The controller 50 may for example be configured to control the bandpass location and/or spectral range of the spectral analyser 70 to facilitate taking measurements at different wavelengths. Optionally, the controller 50 is configured to control the light source 25 and/or the scanning disk assembly 11, 15. In the illustrated embodiment, there is no need to synchronize the operation of the light source 25 or scanning disk assembly 11, 15 with the other components of the apparatus 100, in particular the spectral analyser 70 or optical detector 14 and so there is no need for the controller 50 to control the operation of the light source 25 or scanning disk assembly 11, 15 in this regard. Optionally, however, the controller 50 may be used to turn the control the light source 25 and/or the scanning disk assembly 11, 15 on and off as required. The, or each, controller 50 may take any conventional form, typically comprising a suitably programmed processor, e.g. a microprocessor or microcontroller, and may be connected to the component(s) that it is required to control in any conventional manner.

For most spontaneous Raman imaging applications the scatter from the sample is higher for micro-crystalline materials than for single crystals or non-crystalline materials. It is preferred therefore to use a scanning disk 11 that is configured to suit the application in terms of any one or more of the size of the pinholes 19, the number of pinholes 19, the spacing between pinholes 19 and/or the pattern of the pinholes 19. Optionally, a plurality of different scanning disks 11 (and corresponding lens disks 15 as applicable) are provided, a respective one being selected and installed in the apparatus 100 to suit the application in order to optimise Raman light collection from a particular sample type, e.g. relatively closely spaced pinholes for analysing silicon wafers or graphene monolayers, or relatively widely spaced pinholes for analysis of forensic type powder samples or pharmaceutical tablets. For example, the scanning disk 11 may have between two and twelve nested pinhole spirals per disk depending on the application, although a single pinhole spiral or more than 12 nested pinhole spirals may alternatively be used. Fewer nested spirals reduces imaging speed for a specific disk rotation speed. An image can be acquired for 1/n nested spirals where n is the number of nested spirals (e.g. a disk with 10 nested spirals produces a complete sample illumination pattern for every $10^{th}$ of a disk rotation, 2 nested spirals would mean an image could only be collected every ½ a rotation of the disk).

In preferred embodiments, the apparatus 100 includes a magazine (not shown) for holding multiple scanning disk assemblies, and a power-operated actuation system configured to install any selected one of the disk assemblies in the optical path, typically under control of the controller 50. Alternatively a selected disk assembly may be placed in a removable cartridge which may be manually installed or replaced as needed. Alternatively still, there may be one or more scanning disk assembly, wherein the or each disk has a plurality of sectors, each sector having a different arrangement of pinholes/lenses.

It will be apparent from the foregoing that in preferred embodiments, a scanning Nipkow disk pair is illuminated with excitation light so as to scan a multiplicity of points over the sample 55, typically its surface, and to collect spontaneous Raman scattered light through the same disk pinholes, and to direct the collected light to the optical detector 15 such that a confocal Raman Image is acquired. Embodiments of the invention may also detect Resonance Raman light and/or Surface Enhanced Raman light.

The invention is not limited to the embodiment(s) described herein but can be amended or modified without departing from the scope of the present invention.

The invention claimed is:

1. A Raman analyzing method comprising: illuminating an object with excitation light at a plurality of illumination points simultaneously; and imaging Raman scattered light that emanates from the plurality of illuminated points to an optical detector, wherein said illuminating involves directing the excitation light onto a scanning device to illuminate said object at a plurality of illumination points, and wherein said imaging involves imaging the Raman scattered light to an intermediate image plane, said scanning device being located at said intermediate image plane, said method further including: filtering said Raman scattered light to transmit to said optical detector Raman scattered light only in a selected one or more of a plurality of selectable wavelength ranges; wherein the filtering involves filtering said Raman scattered light to transmit to said optical detector Raman scattered light in a plurality of different selected wavelength ranges, one range at a time, or one group of more than one range at a time; creating a composite Raman image representing Raman scattered light in each of the selected wavelength ranges.

2. The method of claim 1, wherein said illuminating involves scanning a beam of excitation light using a scanning device, and wherein said imaging involves imaging said Raman scattered light to an intermediate image plane, said scanning device being located in said image plane.

3. The method of claim 1, wherein said illumination and said imaging are performed confocally.

4. The method of claim 1, further including filtering light emanating from the plurality of illuminated points to remove said excitation light.

5. A Raman analyzing method comprising: illuminating an object with excitation light at a plurality of illumination points simultaneously; and imaging Raman scattered light that emanates from the plurality of illuminated points to an optical detector, wherein said illuminating involves directing the excitation light onto a scanning device to illuminate said object at a plurality of illumination points, and wherein said imaging involves imaging the Raman scattered light to an intermediate image plane, said scanning device being located at said intermediate image plane, said method further including: filtering said Raman scattered light to transmit to said optical detector Raman scattered light only in a selected one or more of a plurality of selectable wavelength ranges; the method further including creating a Raman image representing Raman scattered light in the selected one or more of the wavelength ranges; creating a respective Raman image representing Raman scattered light in each of the selected wavelength ranges.

6. The method of claim 5, wherein said illuminating involves scanning a beam of excitation light using a scanning device, and wherein said imaging involves imaging said Raman scattered light to an intermediate image plane, said scanning device being located in said image plane.

7. The method of claim 5, wherein said illumination and said imaging are performed confocally.

8. The method of claim 5, further including filtering light emanating from the plurality of illuminated points to remove said excitation light.

\* \* \* \* \*